United States Patent
Morch

[19]

[11] Patent Number: 6,053,348
[45] Date of Patent: Apr. 25, 2000

[54] PIVOTABLE AND SEALABLE CAP ASSEMBLY FOR OPENING IN A LARGE CONTAINER

[76] Inventor: Leo Morch, Gistrupparken 41, DK-9260 Gistrup, Denmark

[21] Appl. No.: 09/001,280

[22] Filed: Dec. 31, 1997

Related U.S. Application Data

[63] Continuation of application No. PCT/DK97/00199, May 1, 1997.

[51] Int. Cl.$^7$ .................................................. B65D 43/26
[52] U.S. Cl. .......................... 220/263; 215/269; 215/280; 220/810; 220/324; 220/211
[58] Field of Search .................................. 220/211, 232, 220/263, 329, 331, 315, 324, 316, 336, 810, 831, 833; 215/269, 280

[56] References Cited

U.S. PATENT DOCUMENTS

| | | | |
|---|---|---|---|
| 1,321,768 | 11/1919 | Mikalson | 220/324 X |
| 2,883,084 | 4/1959 | Shankland | 220/324 |
| 2,954,141 | 9/1960 | Kramer et al. | 220/211 |
| 2,955,452 | 10/1960 | Myers | 220/211 X |
| 3,240,038 | 3/1966 | Schwegler | 220/232 X |
| 3,262,227 | 7/1966 | Pentecost | 220/336 X |
| 3,298,323 | 1/1967 | Becker et al. | 220/336 X |
| 3,694,962 | 10/1972 | McDonald et al. | 220/232 X |
| 3,731,837 | 5/1973 | Platts et al. | 220/336 X |
| 4,114,901 | 9/1978 | Pot | 220/232 X |
| 4,665,653 | 5/1987 | Franz et al. | 220/232 X |
| 5,544,780 | 8/1996 | Jye | 220/211 |

FOREIGN PATENT DOCUMENTS 25 43 731   4/1977   Germany .

*Primary Examiner*—Allan N. Shoap
*Assistant Examiner*—Robin A. Hylton
*Attorney, Agent, or Firm*—Thomas R. Vigil

[57] ABSTRACT

A cap unit (10) for a container (38) has a cap (20) and an annular skirt (12). The skirt (12) is mounted in the container (38) defining an aperture, the cap (20) being movable between a first position and a second position. In the first position the cap (20) covers the aperture and seals it, and in the second position the cap uncovers the aperture, the cap (20) being journalled pivotably around an axis (26) perpendicular to the plan defined by the aperture and placed outside the aperture so that the cap may swing between the first position and the second position. Furthermore, the cap (20) and the skirt (12) have respective claw-formed catching means (14, 16, 18) which are adapted to fix the cap (20) in relation to the skirt (12) and allow the cap (20) to swing from a first to a second position. The cap unit (10) has driving means (34) for production of swinging of the cap (20) and the cap unit (10) has an inflatable sealing ring (22) mounted in the cap (20) for sealing against the upper surface of the skirt (12) when the cap (20) is in its first position, or alternatively mounted in the skirt (12) for sealing against the opposite surface of the cap (20).

8 Claims, 3 Drawing Sheets

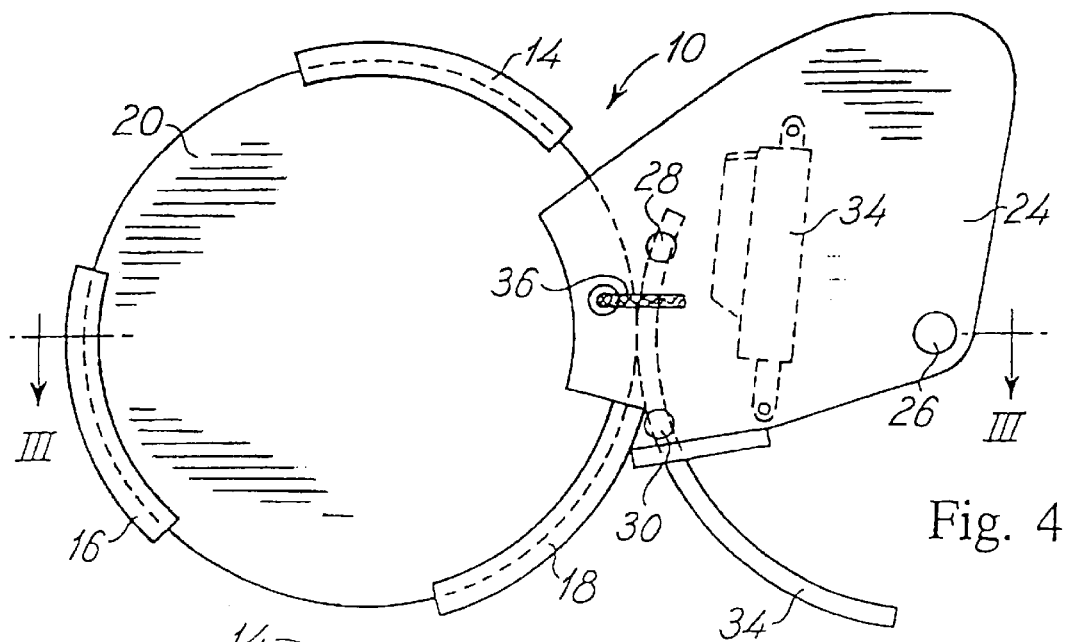
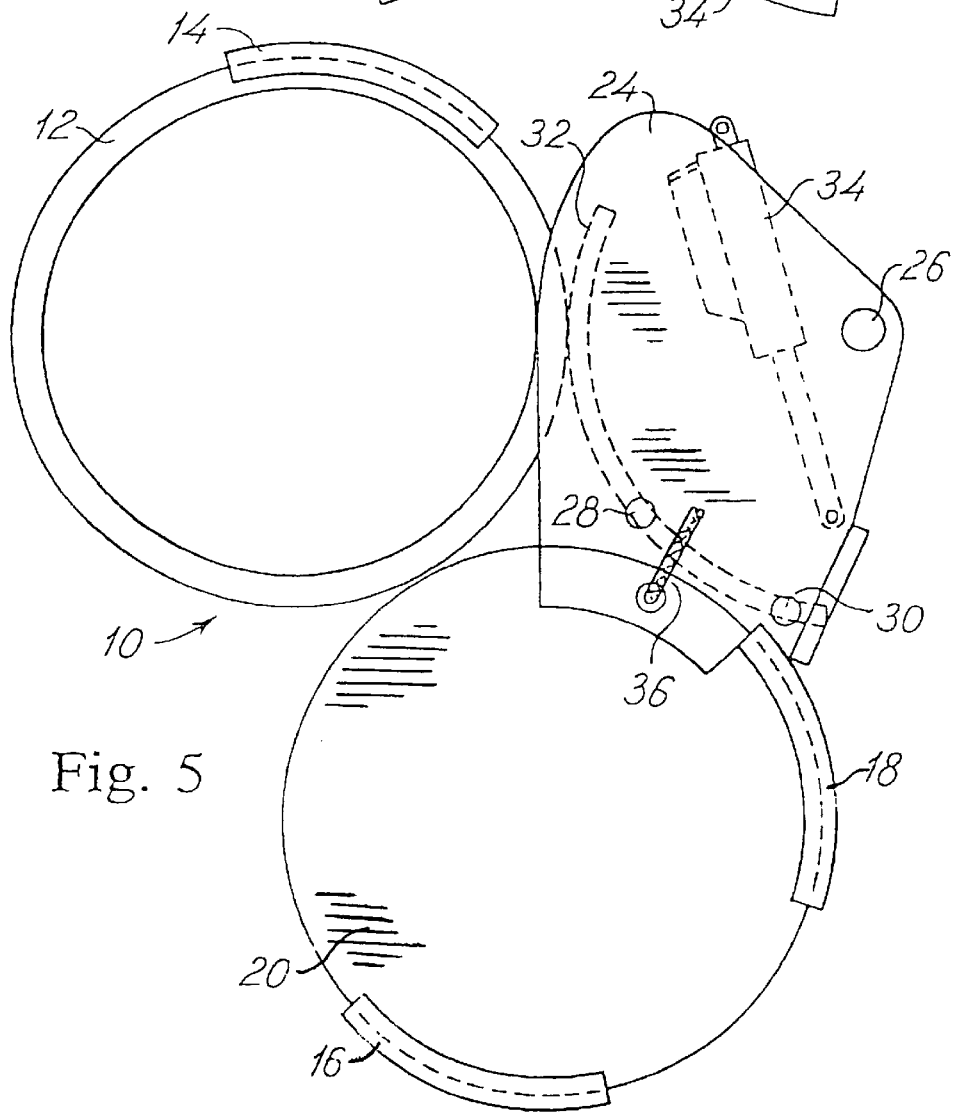

Fig. 6
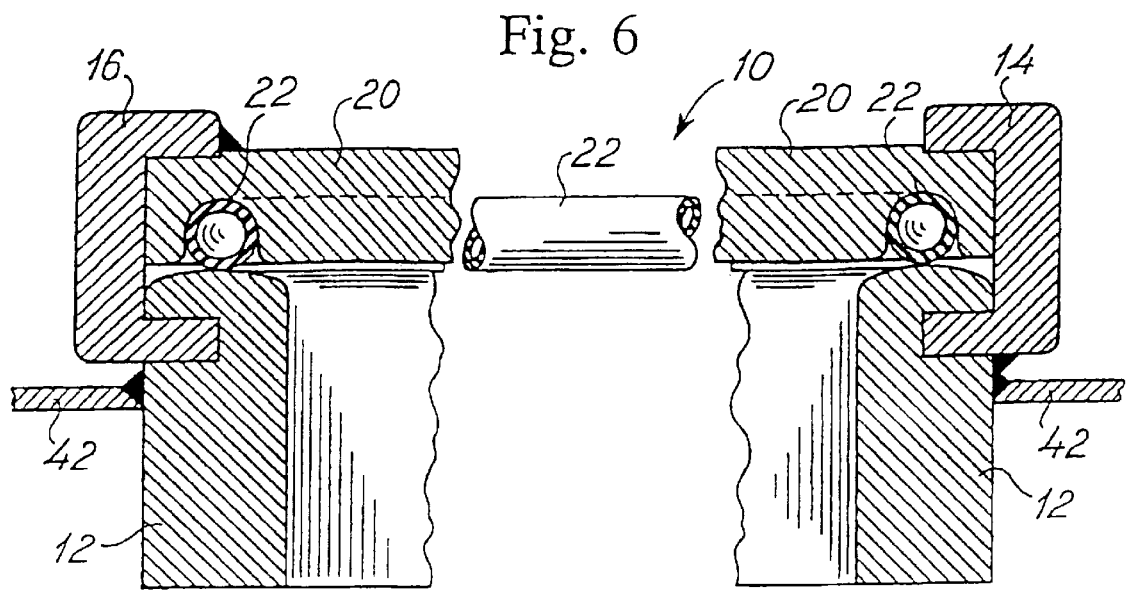
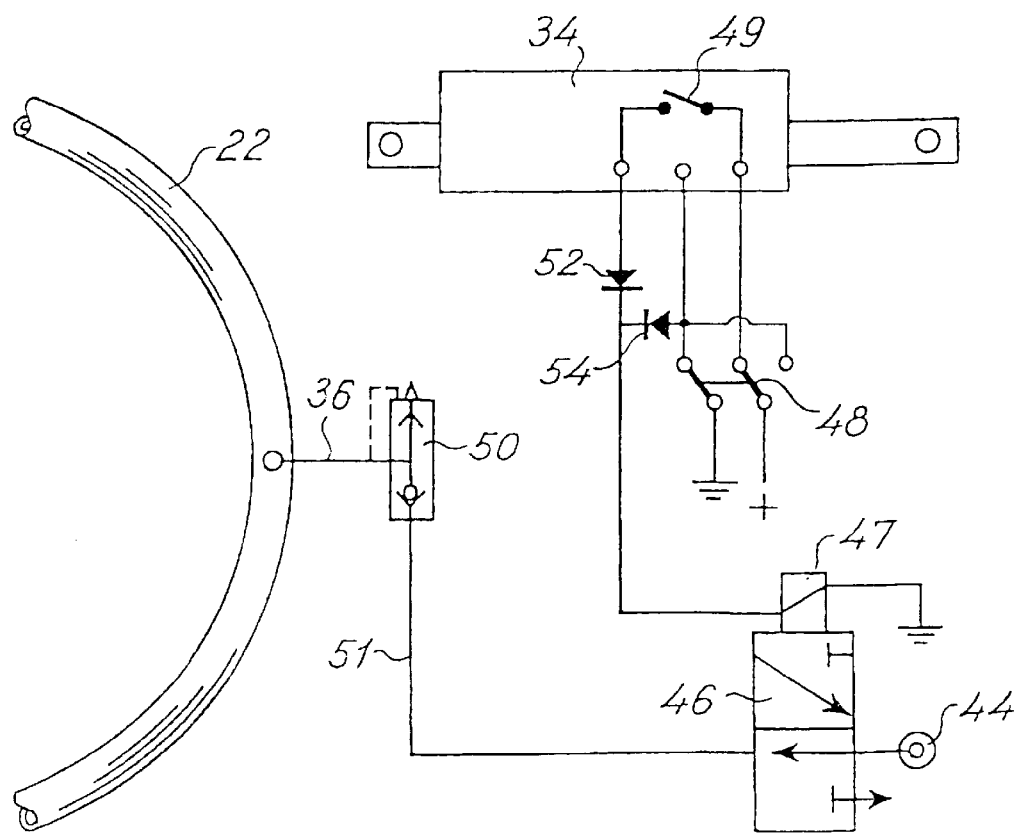
Fig. 7

PIVOTABLE AND SEALABLE CAP ASSEMBLY FOR OPENING IN A LARGE CONTAINER

CROSS REFERENCE TO RELATED APPLICATIONS

This application is a continuing application of PCT/DK97/00199, filed May 1, 1997.

BACKGROUND OF THE INVENTION

1. FIELD OF THE INVENTION

The present invention relates to a cap unit for a container, especially a container on a tank lorry or similar means of transport and having a cap and a circumferential skirt, in which container the skirt is mounted defining an aperture in the container and which cap is movable between a first position and a second position in which first position the cap covers the aperture and seals it and in which second position the cap at least partly uncovers the aperture, the cap being revolvably journalled around an axis extending perpendicularly to the plane defined by the aperture and being located outside the aperture so that the cap is able to swing in a plan parallel with the plane defined by the aperture between the first position and the second position, and the cap and the skirt having respective claw-shaped catching means which are arranged so as to maintain the cap longitudinally in relation to the skirt and at the same time allow the cap to swing from the first position to the second position around the mentioned pivoting axis.

2. DESCRIPTION OF THE PRIOR ART

Conventional cap units used in tank lorries are mounted on the highest point of the tanker and are provided with a number of screw spindles, typically 3–6 screw spindles per cap, which are to be handled manually in order to allow closing and opening of the cap unit. In a feed tanker or other tank lorry, for instance a tank lorry transporting chemicals, petrol, fuel oil, cement, feed or feedstuff, 4–8 cap units may typically be mounted depending on the size and compartment division of the tank lorry.

When filling fluid or particulate material on the tank lorry the driver in the first place has to get off the driver's cab and climb to the top of the tank lorry, typically in a height of 3–4 meter above the ground, raise the safe handrail which is statutory on tank lorries, open the cap units by releasing the screw spindles of the respective cap units, typically 12–48 screw spindles, remove the safe handrail, dismount the top of the tank lorry, board the driver's cab of the lorry and drive the lorry to the point below the storage silo or another place for filling of fluid or particulate material to the tank lorry.

After filling of material to the tank lorry the same phases of work have to be made after the tank lorry has been driven away from the position below the storage silo, with the only difference that at this stage the screw spindles are not to be released but to be fastened. As is evident, these phases of work are very time-consuming and rather dangerous to the driver who has to climb the top of the tank lorry twice during the filling process and in a substantial height above the ground make a number of manual operations, even in unpleasant weather such as rain, sleet or snow.

SUMMARY OF THE INVENTION

A purpose of the present invention is to provide a cap unit of the type described above which cap unit is suitable for remote control and enables an opening of the cap unit, i.e. a movement of the cap from the first position to the second position and vice versa and at the same time enables a sealing of the cap in relation to the aperture in the first position.

This position is reached by a cap unit of the type described above which cap unit according to the present invention is characterized by having driving means for generation of turning of the cap unit between the first and the second position and vice versa and that the cap unit has an inflatable sealing ring which is mounted in the cap unit in the surface facing the skirt for sealing against the upper side of the skirt when the cap is in its first position, or alternatively mounted in the upper side of the skirt for sealing against the opposite surface of the cap when the cap is in its first position.

The cap unit according to the present invention is provided with driving means which may be activated by remote control, i.e. either by electric, hydraulic or pneumatic control, to provide the turning of the cap between its first and its second position and vice versa. In accordance with the teachings of the present invention the claw-shaped catching means are produced so as on the one hand to allow the cap to turn in relation to the skirt around the mentioned turning axis and on the other hand to allow the cap to be locked axially in relation to the skirt in the first position of the cap. For provision of the sealing between the cap and the skirt the cap unit is in accordance with the present invention provided with an inflatable sealing ring which serves the purpose of sealing between the lower side of the cap of the cap unit and the skirt of the cap unit, the inflatable sealing ring being mounted in the cap in the surface facing the skirt or alternatively be mounted in the upper side of the skirt for sealing against the opposite surface of the cap.

Within the prior art certain remote control port or valve assemblies are known which, however, do not exhibit the combination of the elements characteristic of the present invention. From German published patent application no. 2543731 a cap of the type described in the introductory part is known which cap is used for a pressure tank and in which an O-ring is provided between the cap and the skirt which O-ring produces the sealing between the cap and the skirt when the cap is pressed against the skirt.

U.S. Pat. No. 3,345,042 discloses a rectangular sliding door for a pressure or vacuum container in which sliding door a hose formed gasket is mounted running along the periphery of the sliding door and when inflated sealing tightly against the gasket surface of the aperture of the pressure chamber.

U.S. Pat. No. 3,694,962 discloses a rectangular sliding door for a pressure chamber intended for sterilization purposes, e.g. by means of vapor in which a track having an almost u-shaped cross-section which is open against the sliding door is provided around the aperture of the wall of the pressure chamber. In the track an O-ring gasket is mounted which is able to fill out the track in its entire width and at the same time the gasket may be displaced outwardly or inwardly in the track, and pressure either above or below atmospheric behind the gasket may be supplied through a pressure fluid connection to the bottom of the track.

U.S. Pat. No. 4,114,901 discloses a bottom cap for cutting off the unloading hatch in a hopper barge. This bottom cap may be sealed in relation to the hopper barge by means of an inflatable gasket which is able to seal tightly against a bottom cap when it is in its closed position and pressure is provided to the gasket.

U.S. Pat. No. 5,141,125 discloses a pressure container having an inspection aperture in which a slide gate is provided which slide gate is able to pivot around an axis perpendicular to the closing surface. Below the revolving sliding gate a slidable sealing O-ring containing spring plungers is provided for sealing when closing the sliding gate.

It is an especially advantageous feature of the cap unit according to the present invention compared to certain prior art openable assemblies, for instance the sliding gates and the bottom apertures in hopper barges etc. described above, that the cap in accordance with the teachings of the present invention swings in relation to the skirt around an axis which is located outside the aperture, which on the one hand makes it possible that the claw-shaped catching means can fixate the cap in relation to the skirt in its first position and allow the cap to swing from the first position and to the second position in relation to the skirt, and on the other hand ensures that the swinging is made with a very small slipping or gapping in contradiction to a linear sliding movement which, as is well known for people skilled in the art, always exhibits substantially larger slipping or gapping than a corresponding pivoting movement around a pivoting axis.

Within the scope of the present invention the cap unit may be produced in numerous ways corresponding to specific conditions and circumstances and may thus be produced in varying geometry and forms. Thus, the skirt may in accordance with alternative embodiments be of arbitrary outer contour such as elliptical or other curved contours which preferentially do not exhibit bends but constitute a continuous and inflection tangent free geometrically contour. The preferred embodiment of the skirt of the cap unit according to the present invention is a circular cylindrical skirt defining a circular aperture, the cap correspondingly constituting a circular plane or dome-shaped plate defining a radial edge part for abutment on and sealing by means of the inflatable sealing ring against the annular top side of the skirt.

The claw-shaped catching means characteristic of the present invention which claw-shaped catching means in the first position of the cap are arranged so as to fixate the cap axially in relation to the skirt and so as to prevent the cap from being lifted from abutment against the skirt (when a certain minimum slipping or gapping such as a gaping of 1–2 mm serving the purpose of allowing the cap to swing from its first position towards the second position is left out of account), may be adjusted to the circumstances and for example be provided with a number of clamp-formed elements located along the periphery of the cap and the skirt in the first position or as a two-part, substantially flange-formed component, one part of which is fixated to the flange and the second part of which is fixated to the cap and which are arranged so as to catch around the cap and engage with a track in the exterior wall of the flange, respectively. In the preferred embodiment of the cap unit according to the present invention the claw-shaped means comprise a number of clamps at least one of which is firmly connected to the skirt and extends across an angle along the periphery of the skirt diametrically opposite to the point where the cap is swung against the second position from the first position, and two or more clamps which are firmly connected to the cap and are arranged to engage with a circumferential, peripheral track in the exterior wall of the skirt.

The generation of the swinging of the cap in relation to the skirt may be produced in an arbitrary, suitable way, for instance by a number of intermediate poles, a rack assembly or preferably in accordance with the presently preferred embodiment of a cap unit according to the present invention by means of a plate-formed component onto which the cap is mounted and which is fixated to the skirt or alternatively to the container to which the skirt is fixated, by means of a bolt determining the pivoting axis of the cap.

Although the cap of the cap unit according to the present invention may swing exclusively supported in relation to the pivoting axis for instance by means of the bolt described above, it is preferred, as the cap unit will typically be of relatively large size and for instance be of a size fulfilling the requirement that the area of the aperture defined by the skirt is not less that a certain minimum corresponding to for example a manhole, i.e. a minimum diameter of 420 mm, that the cap unit has further supporting means for support of the cap during swinging from the first to the second position and vice versa.

These support means may be constituted by arbitrary suitable means such as a supporting plate against which either the cap or the above described plate-formed component engage during the swinging of the cap from its first to its second position and vice versa. In the preferred embodiment of the cap unit according to the present invention the support means are constituted by an annular support component firmly connected to the skirt or by an annular support component firmly connected to the container on which the skirt is connected, the center of which is located on the pivoting axis mentioned. This annular support component may either support the cap in itself or the plate-formed component mentioned above onto which the cap is fixated.

In order to reduce the friction between the supporting component and the component which is supported by the annular supporting element, either the cap or the plate-formed component mentioned above, it is preferred that friction reducing means are provided such as antifriction bearings or roller bearings for cooperating with the annular supporting component and for support of the plate component or alternatively the cap in relation to the annular supporting component during the swinging of the cap.

The driving means characteristic of the present invention for production of the swinging of the cap between the first and the second position and vice versa may as mentioned above be constituted by arbitrary, electric, hydraulic or pneumatic means, but typically they are constituted by an electrically driven actuator provided on the electric installation of the vehicle, or alternatively the cap unit according to the present invention is used on a lorry providing compressed air as a propellant for the driving means.

Furthermore, the cap unit according to the present invention is preferably provided with control means which are arranged to secure a fail-safe operation of the remote controllable cap unit by arranging the inflatable sealing ring so as to only being able to be inflated when the cap is swung to the first position and so as to be aerified when the cap is swung from the first position. Based on well-known technical principles these control units may be further developed in accordance with specific, required control functions and safety routines.

BRIEF DESCRIPTION OF THE DRAWINGS

FIG. 4 and 5 illustrate the cap unit illustrated in FIG. 1 seen from above in closed and open position, respectively.

FIG. 6 is a sectional view corresponding to the view of FIG. 3 illustrating in more details the particulars of the closing mechanism of the cap unit according to the present invention, and FIG. 7 is a control diagram for the cap unit according to the present invention.

DESCRIPTION OF THE PREFERRED EMBODIMENT(S)

Figure 1:
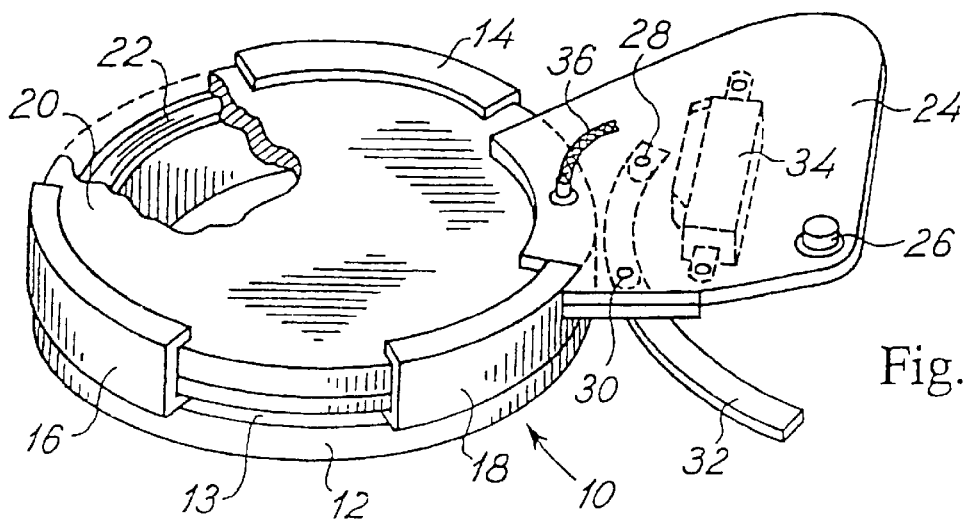
FIG. 1 is a perspective, schematic and partly cut away view of a first and presently preferred embodiment of a cap unit according to the present invention.

FIG. 1 is a schematic and perspective view of the first and presently preferred embodiment of a cover assembly including a circumferential skirt and a cap unit for covering and closing an upper, outer end of the skirt which is positioned around an aperture in a top wall of a large container or pressure tank, especially a tank lorry container for transportation of fluid or particulate material such as chemicals, powders, feedstuff, etc. During transportation the materials to be transported is kept at a pressure above atmospheric of typically 0.5–8, such as 0.6 bar. In accordance with the present invention the cap unit is, as will be described in further details below, produced as a revolvable cap unit. In FIG. 1 the cap unit according to the present invention is designated the reference numeral 10 and is mounted on an upwardly extending circular cylindrical skirt 12, along which a circular section of approx. 60° is covered by clamps 14,16 and 18 having equal angle spacing and thus being placed with a mutual angle spacing of 120°. The clamp 14 is firmly mounted and firmly connected in relation to the skirt, whereas the clamps 16 and 18 are fixated to a circular plate 20 which constitutes the cover plate or cap of the cap unit. As will be described in more details below the clamps are arranged to engage with a circumferential groove 13 in the skirt 12. On the lower surface of the plate 20 an inflatable sealing ring or sealing hose 22 is mounted in a circumferential circular track, which sealing ring or sealing hose is arranged to seal by inflation against the upper side of the skirt 12 and thus produce a hermetic tightening and sealing of the plate 20 in relation to the skirt 12.

To the upper side of the plate 20 a connection plate 24 is mounted serving the purpose of connecting the plate 20 to a rotational axis defined by a bolt 26 so that the plate 20 is able to swing from the closed position illustrated in FIG. 1 by pivoting around the rotational axis defined by the bolt 26. In order to control the pivoting of the plate 20 around the rotational axis defined by the bolt 26 two ball bearings 28 and 30 are mounted on the lower surface of the plate 24 which ball bearings rest against annular support component or arcuate a feed track 32 which is secured to an outer surface of the skirt 12 as shown in FIG. 5 or otherwise supported by a wall 42 of the container 38 and which are supported by the annular support component or arcuate feed track 32 when the plate 20 is rotated from the position illustrated in FIG. 1. The annular support component or feed track 32 defines a circular path having its center in the rotational axis defined by the bolt 26. For production of the rotation or pivoting of the plate 20 around the bolt 26 an electrically driven actuator 34 is provided. Similarly, in FIG. 1 a pressure hose 36 is illustrated serving the purpose of enabling supply of compressed air to the inflatable sealing ring 22 described above.

Figure 2:
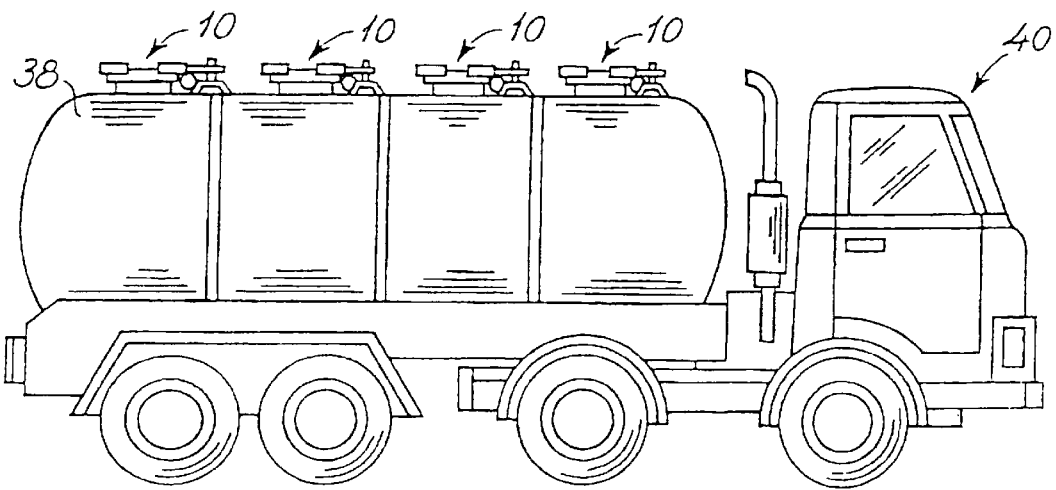
FIG. 2 is a schematic side view of a tank lorry for transportation of fluid or particulate material and with a number of pressure caps, more precisely four pressure caps, mounted on the tank lorry.

FIG. 2 illustrates in details the application of the cap unit described above with reference to FIG. 1 which cap unit is mounted on the upper side of a container 38 of a vehicle 40. No detailed description of the vehicle 40 will be given here which vehicle constitutes a conventional vehicle with a pressure tank, especially a tank container for transportation of fluid or particulate material such as chemicals, powders, feedstuff or the like. The cap units 10, of which a number of four is illustrated in FIG. 2, make it possible to open the container for filling or emptying the container 38 for material and thereafter close the cap units by means of remote control from the driver's cab of the vehicle 40.

Figure 3:
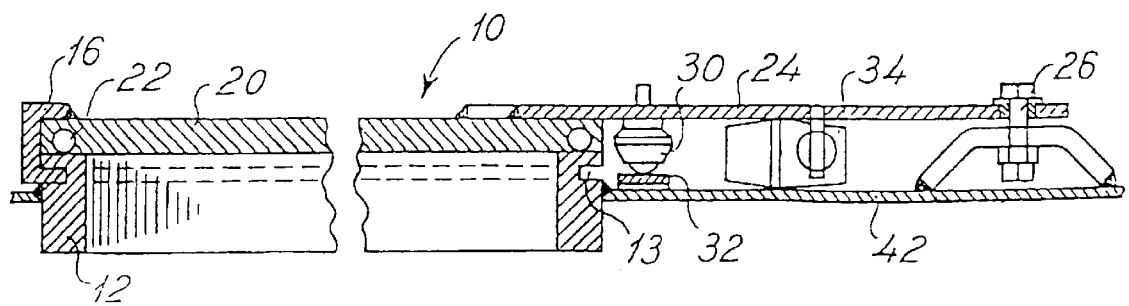
FIG. 3 is a sectional view of the cap unit illustrated in FIG. 1 in the closed position illustrated in FIG. 1.

FIG. 3 is a schematic, sectional view through the cap unit 10 illustrated in FIG. 1 illustrating in details the above described components, especially the embodiment of the skirt 12 and the locking of the clamp 16 in a circumferential peripheral outer track in the skirt 12 designated by the reference numeral 13.

In FIG. 4 and 5 the cap unit 10 is illustrated in closed and open position, respectively, illustrating in FIG. 1 the locking of the plate 20 by means of the clamps 14, 16 and 18 to the underlying skirt 12 which is not illustrated in FIG. 4 but is illustrated in FIG. 5 which figure correspondingly illustrates the manner in which the clamp 14 constitutes a clamp which is firmly connected to the skirt 12, whereas the clamps 16 and 18 are movable together with the plate 20.

FIG. 6 is a sectional view corresponding to the sectional view of FIG. 3 illustrating only the diametrically opposite exterior parts of the cap unit 10 and further illustrating the embodiment of the skirt 12 and the cooperating inflatable sealing ring 22. FIG. 6 furthermore illustrates how the skirt 12 is fixated by welding to a wall 42 of the container 38. The skirt 12 constitutes as illustrated in FIG. 6 an annular construction with an upwardly rounded dome-shaped surface allowing the plate 20 to swing over the skirt with a limited latitude or gapping of the order of few millimeter, typically 1–2 mm, without damaging the upper surface of the skirt 12 against which the inflatable sealing ring 22 is to engage tightening in the closed position of the cap unit illustrated in FIGS. 1, 3, 4 and 6.

FIG. 7 illustrates a control diagram for the cap unit 10 according to the present invention. More precisely, the diagram illustrated in FIG. 7 shows the control of the pressure air supply to the inflatable sealing ring 22 to which pressure air is supplied from a pressure air source via a pressure air feeding hose 44 via a ½ valve 46. The valve illustrated in FIG. 7 is positioned under pressure when the pressure and tank cap 20 is closed, i.e. when the plate 20 in the position illustrated in FIGS. 1, 3, 4 and 6 covers the aperture through the skirt 12. The valve 46 is an electric control valve operated by a two-way switch 48 supplying either positive voltage, typically +24 volt DC voltage, via a circuit breaker 49 integrated in the actuator 34, or ground to the coil 47 of the valve 46. The circuit breaker 49 serves the purpose of disconnecting the voltage to the coil 47 of the valve 46 when the correct final position is detected, i.e. the position illustrated in FIG. 4, in which the plate 20 is positioned correctly below the clamp 14 whereas the clamps 16 and 18 correspondingly engage with the annular peripheral track 13 in the skirt 12. This correct final position is detected by the circuit breaker 49 integrated in the actuator 34 which also disconnects the voltage supply to the actuator 34 when the correct final position is reached. Thus, the inflatable sealing ring 22 is permanently under pressure when the cap 20 is in its correct final position and the valve 46 is not activated 46 in this final position and thereafter pressure air is supplied via the valve 46 from the pressure air hose 44 to the rapid bleeder valve 50 via a pressure air conduit 51 connecting the rapid bleeding valve 50 and the ½-way valve 46. By activating the switch 48 voltage is supplied to the coil 47 of the valve 46, and thus the value 46 is activated and vents the inflatable sealing ring 22 through the rapid bleeder value 50, the pressure air conduit 51 and the valve 46. Furthermore, in FIG. 7 two isolation diodes 52 and 54 are illustrated which connect the coil 47 of the valve 46 to the electrically driven actuator 34 and to the switch 48, respectively, as illustrated in FIG. 7.

The cap unit illustrated in FIG's. 1–6 was produced with the following dimensions. The plate 22 was a 22 mm aluminum plate having an outer diameter of 540 mm. The skirt 12 was an aluminum skirt with an interior aperture diameter of 480 mm and an exterior aperture diameter of 540 mm. The skirt had a total height of 70 mm, whereas the circumferential, peripheral track 13 had a height of 10 mm, a radial depth of 15 mm and was placed in a height of 10 mm from the upper side of the skirt. The inflatable sealing ring was mounted in an annular track in the bottom surface of the plate 20 defining a central diameter of 500 mm. The rack for receiving the inflatable sealing ring 22 was a roughly circular track having lower inwardly extending rounded shoulders for fixating of the inflatable sealing ring in non-inflated condition. The inflatable sealing ring 22 was a silicon rubber hose having a wall thickness of 2,5 mm and an outer diameter of 17 mm and an inner diameter of 12 mm. The skirt 12 had a wall thickness of 30 mm, upwardly defining a strip-formed, circumferentially plane upper surface located centrally on the wall of the skirt and with a width of 10 mm and which in rounded shoulders extended into the inner and outer wall of the skirt. The clamps 14,16 and 18 were produced by a round plate which was cut into six 60° sections corresponding to totally two cap units. The round plate from which the clamps 14, 16 and 18 were cut defined a maximum height of 55 mm, a free inner diameter of 510 mm and an outer diameter of 570 mm. The round plate defined an inner aperture corresponding to the inner aperture height of 35 mm. The cap unit produced in this manner had an air cap from open to closed position of 1–2 mm.

Reference Numerals

| | |
|---|---|
| 10 | Cap unit |
| 12 | Skirt |
| 13 | Circumferential peripheral outer track |
| 14 | Clamp |
| 16 | Clamp |
| 18 | Clamp |
| 20 | Plate |
| 22 | Inflatable sealing ring |
| 24 | Connection plate |
| 26 | Bolt |
| 28 | Ball bearing |
| 30 | Ball bearing |
| 32 | Annular support component or feed treack |
| 34 | Electrically drive actuator (24 volt) |
| 36 | Pressure air hose |
| 38 | Container |
| 40 | Vehicle |
| 42 | Wall |
| 44 | Pressure air conduit |
| 46 | 3-/2-way valve |
| 47 | Coil |
| 48 | Two-way switch |
| 49 | Circuit breaker |
| 50 | Rapid bleeder valve |
| 51 | Pressure air conduit |
| 52 | Diode |
| 54 | Diode |

I claim:

1. In combination, a large container (38) having a top aperture and a circumferential skirt (12) extending upwardly from said container around said aperture and a cap unit (10) for covering said top aperture said cap unit (10) comprising a cap (20) movable between a first position and a second position, said cap (20) in said first position covering and sealing the aperture and said cap (20) in said second position, at least partly uncovering the aperture, said cap (20) being journalled pivotably around a pivot axis (26) which is located laterally outwardly of the area of said cap (20) and which extends perpendicularly to a plane defined by said cap (20) so that said cap can swing in a plane parallel with the plane defined by the aperture between the first position and the second position, and said cap (20) and the skirt (12) having respective claw-forming catching means (14, 16, 18) constructed and arranged to maintain said cap (20) in its first position axially in relation to said skirt (12) by engaging in said skirt (12) and over said cap (20) and at the same time allow said cap (20) to swing from said first position to said second position around said pivot axis (26) defined by a bolt (26) located radially outwardly from said cap (20), said cap unit (10) having driving means (34) for swinging said cap (20) between said first and said second positions and vice versa, means (32) for supporting said cap (20) during swinging movement between the first and second positions comprising (a) a plate (24) fixed to said cap, (b) an arcuate track (32) firmly connected to one of the top wall of the container or the skirt (12), a center of an arc of the track being on said pivot axis, and (c) bearing means between said plate and said track (32) for supporting said plate on said track (32), and said cap unit (10) having an inflatable sealing ring (22) which is mounted in one of an underside of said cap (20) and an upper facing side or surface of the skirt (12) for sealing against the upper side or surface of the skirt (12) when said cap (20) is in its first position or alternatively mounted on the upper side or surface of the skirt (12) for sealing against an opposite side or surface of said cap (20) when it is in its first position.

2. The combination according to claim 1, wherein said circular cylindrical skirt (12) defines a circular aperture and said cap (20) is one of a circular or dome-shaped plate defining a peripheral margin part for abutment and sealing by means of said inflatable sealing ring (22) against said annular upper side of said skirt (12).

3. The combination according to claim 1 wherein said claw-formed catching means (14, 16, 18) comprises a number of clamps (14, 16, 18) of which at least one (14) is firmly connected with said skirt (12) and extends over an angle along the periphery of the skirt (12) diametrically opposite the point where said cap (20) is swung towards the second position from the first position, and two or more clamps (16, 18) which are firmly connected to said cap (20) and is constructed and arranged to engage with an annular peripheral track (13) in an exterior wall (12) of said skirt (12).

4. The combination according to claim 1 wherein said plate (24) fixed to said cap (20) is mounted on said bolt (26) for determination of said pivot axis.

5. The combination according to claim 1 wherein said bearing means comprises one of ball bearings or roller bearings, (28, 30) which are mounted on said plate (24) for cooperation with said arcuate track (32) for supporting the plate (24) in relation to said arcuate track (32) during the pivoting of said cap.

6. The combination according to claim 1 wherein said driving means (24) comprises an electrically driven actuator (34) for production of pivoting movement of said cap between its first position and its second position and vice versa.

7. The combination according to claim 6 further comprising control means which are constructed and arranged exclusively to allow inflation of the inflatable sealing ring (22) when said cap, driven by said electrically driven actuator (34), is swung to said first position and is constructed and arranged to vent said inflatable sealing ring (22) when said cap, driven by said electrically driven actuator (34), is swung from the first position.

8. In a container assembly including a large container having a top wall with at least one aperture therein, the improvement residing in a cover assembly for covering and for opening, closing and sealing said aperture in said top wall of said large container, said cover assembly comprising:

a circumferential skirt extending upwardly from and being fixed to the top wall of the container around the aperture and having an upper, outer end surface;

a cap having a lateral extent;

said cap being movable between a first position and a second position;

said cap in said first position covering said upper, outer end surface of said skirt above the aperture and said cap in said second position at least partly uncovering said skirt above the aperture;

pivot mounting means for pivotably mounting said cap for swinging movement around a pivot axis which is located laterally outwardly of the lateral extent of said cap and which extends generally parallel to a plane containing said cap, whereby said cap can swing in said plane between said first position and said second position;

means for holding said cap juxtaposed to said upper, outer end surface of said skirt and against movement outwardly away from said upper, outer end surface while allowing swinging movement of said cap laterally to and from said skirt to said second position;

means for swinging said cap with said pivot mounting means between said first and second positions;

support means including (a) an arcuate track firmly connected to one of the top wall of the container or said skirt, a center of an arc of said track being on said pivot axis, (b) said pivot mounting means and (c) bearing means between said arcuate track and said plate for suqDortinc said plate on said track; and, an inflatable sealing ring positioned between an underside of said cap and said upper, outer end surface of said skirt for establishing a seal between said under side of said cap and said upper, outer end surface of said skirt when said cap is in its first position.

* * * * *

UNITED STATES PATENT AND TRADEMARK OFFICE
CERTIFICATE OF CORRECTION

PATENT NO : 6,053,348
DATED : April 25, 2000
INVENTOR(S) : Leo Morch

It is certified that error appears in the above-identified patent and that said Letters Patent are hereby corrected as shown below:

Column 5, line 42, after "against" insert --an--.

Column 5, line 44 "FIG. 5" should be --FIG. 1--.

Column 7, line 9, "rack" should be --track--.

Column 7, line 14, "2,5" should be --2.5--.

Column 7, line 43, "treak" should be --track--.

Column 7, line 49, "3-2-way" should be --3/2-way--.

Column 10, line 14, "suqDortinc" should be --supporting--.

Signed and Sealed this

Fifteenth Day of May, 2001

Attest:

NICHOLAS P. GODICI

Attesting Officer

Acting Director of the United States Patent and Trademark Office